United States Patent [19]

Sakoe

[11] 4,286,115
[45] Aug. 25, 1981

[54] SYSTEM FOR RECOGNIZING WORDS CONTINUOUSLY SPOKEN ACCORDING TO A FORMAT

[75] Inventor: Hiroaki Sakoe, Tokyo, Japan

[73] Assignee: Nippon Electric Co., Ltd., Tokyo, Japan

[21] Appl. No.: 58,598

[22] Filed: Jul. 18, 1979

[30] Foreign Application Priority Data

Jul. 18, 1978 [JP] Japan .................................. 53-87849

[51] Int. Cl.$^3$ .............................................. G10L 1/00
[52] U.S. Cl. ................................................ 179/1 SD
[58] Field of Search ......................... 179/1 SD, 1 SB; 340/146.3 WD

[56] References Cited

U.S. PATENT DOCUMENTS

| | | | |
|---|---|---|---|
| 3,816,722 | 6/1974 | Sakoe et al. ......................... | 179/1 SD |
| 4,049,913 | 9/1977 | Sakoe ................................. | 179/1 SD |
| 4,059,725 | 11/1977 | Sakoe ................................. | 179/1 SD |
| 4,156,868 | 5/1979 | Levinson ............................ | 179/1 SD |

OTHER PUBLICATIONS

G. Clapper, "Connected Word Recognition System", IBM Tech. Discl. Bull., Dec. 1969.

Primary Examiner—Mark E. Nusbaum
Assistant Examiner—E. S. Kemeny
Attorney, Agent, or Firm—Sughrue, Rothwell, Mion, Zinn and Macpeak

[57] ABSTRACT

A continuous speech recognition system utilizes a format memory (14) which specifies a sequence of word sets and a plurality of words, or reference patterns, which may be included in each word set. The input pattern sequence is divided into all possible partial patterns having start points p and end points q, and each of these partial patterns is compared with all reference patterns to derive elementary similarity measures. The elementary similarity measures for each combination of a partial pattern and a permitted word in a word set under the specified format are then examined to determine the optimum input pattern segmentation points and corresponding sequence of reference patterns which will yield a maximum similarity result. The maximum similarity is represented by

$$T = \max_{p(x)} \Sigma_{x=1} \max_{n(x) \epsilon f_x} S(p(x-1), p(x), n(x)),$$

where $S(p(x-1), p(x), n(x))$ indicates the degree of similarity between an input partial pattern having a start point $p(x-1)$ and an n point $p(x)$ and a reference word unit $n(x)$ within a word set $f_x$, and K represents the number of word sets permitted according to the specified format.

4 Claims, 9 Drawing Figures

SYSTEM FOR RECOGNIZING WORDS CONTINUOUSLY SPOKEN ACCORDING TO A FORMAT

BACKGROUND OF THE INVENTION

This invention relates to a continuous speech recognition system for automatically recognizing continuous speech sound of continuously spoken word or words. A system according to this invention is specifically adapted, although not exclusively, to recognition of at least two input words continuously spoken according to a format.

A continuous speech recognition system is advantageous for use as a device for supplying data and/or program words to an electronic digital computer and a device for supplying control data to various apparatus. It has, however, been difficult with a sophisticated speech recognition system to recognize continuously spoken words. For correct recognition, data and/or program words or control data must be pronounced or uttered word by word. On supplying a computer with, for example, data consisting of a plurality of digits, it was necessary to pronounce the data on a digit by digit basis. Consequently, the sophisticated system was slow in operation and inconvenient for users.

Speech recognition has been approached in various ways. The simplest and most effective way is to resort to the technique of pattern matching. According to the pattern matching technique applied to recognition of a discrete input word, a vocabulary consisting of a plurality of reference words is selected. The input word should be one of the reference words. Master or reference patterns are provided with the reference words individually spoken, each reference word in at least one manner of pronunciation. An appreciable number of reference patterns are thus used to represent the reference words of the vocabulary. Comparison or pattern matching is carried out between a pattern of input speech sound (hereafter called an input pattern) of the input word to be recognized by the system and every reference pattern. For each reference pattern, a quantity is derived as a result of comparison, which quantity represents a degree of likelihood or similarity (hereafter referred to as a similarity measure) between the input pattern and the reference pattern under consideration. The input pattern is recognized to be the reference word, the reference pattern provided for which gives a maximum of the similarity measures derived for the respective reference patterns. In this manner, it is possible with the system to recognize an input pattern representative of any other reference word in the vocabulary by the use of the reference patterns.

In U.S. Pat. No. 4,059,725 (United Kingdom Patent Application No. 1,009 of 1976) issued to the present applicant, assignor to the instant assignee, a much improved continuous speech recognition system is disclosed wherein the pattern matching technique is carried out between an input pattern as a whole and a plurality of reference pattern concatenations obtained by concatenating reference patterns of all allowable or possible numbers. A concatenation of certain pattern is a permutation with repetition of the patterns in question. Sums of what may be named partial similarity measures are calculated as a result of comparison of the whole input pattern with the reference pattern concatenations. Decision is made by finding that number of words and that concatenation of reference pattern or patterns which give a maximum of the partial similarity measure sums. In practice, the maximum partial similarity measure sum is found in two steps, on the word basis at first and then for the whole. It is possible to apply the technique of dynamic programming to finding out the maximum in each step to reduce the amount of calculation and thereby to raise the speed of recognition.

In U.S. Pat. No. 4,049,913 (United Kingdom Patent Application No. 44,643 of 1976) issued also to the present applicant and assigned to the instant assignee, another improved continuous speech recognition system is revealed wherein the above-described pattern matching technique and the decision process are carried out with the number of word or words preliminarily specified either by a single integer or by a set of integers. This system is very accurately operable in specific fields of application. This system and the system disclosed in U.S. Pat. No. 4,059,725 are believed to be the best available continuous speech recognition systems at present.

It is a tendency common to practical continuous speech recognition systems that misrecognition is liable to occur more or less. This is because the speech sound supplied to the system for recognition is not always completely congruent in timbre and other respects with the speech sound used to provide the reference patterns. It is therefore very important to avoid the possible misrecognition even at a cost of some restrictions on the part of users in speaking the input word or words. The restriction or restrictions, however, should not reduce the speed of operation and should be tolerable in practice on using the system. An example of a tolerable restriction is to preliminarily specify the number of input word or words as is the case with the system disclosed in U.S. Pat. No. 4,049,913.

SUMMARY OF THE INVENTION

It is therefore an object of the present invention to provide a continuous speech recognition system speedily and correctly operable in specific fields of application.

It is another object of this invention to provide a continuous speech recognition system of the type described, which causes least possible inconvenience to users.

It is still another object of this invention to provide a continuous speech recognition system of the type described, which is adapted to recognition of input words continuously spoken according to a format.

It is yet another object of this invention to provide a continuous speech recognition system of the type described, which is capable of recognizing an input pattern representative of at least two words.

In the continuous speech recognition system according to the present invention, an input speech signal includes a sequence of spoken words which must occur according to a predetermined format. For example, in a business transaction system the speech signal may comprise the name of goods sold followed by the quantity in the form of a predetermined number of digits. Thus, the first one or more spoken words may represent one of a predetermined number of different types of goods, and the last three words may be the quantity such as "milk chocolate 019". A further example of this format requirement may be in the reading of birthdates into a computer such as "780718" representing July 18, 1978. In this latter example, the input speech sequence involves six words each of which is selected from a particular set of words. Inasmuch as the present year is 1979, the first digit may be any one of 0 to 7. Since the months are numbered from 01 to 12, the third digit may be either 0 or 1. Further, since the days of the month are from 01 to 31, the fifth digit may be any one of 0, 1, 2 or 3. The second, fourth and sixth digits may be any one of 0 to 9. Thus, the input word sequence according to the present invention must comprise at least two word sets, with the two word sets in the above-described birthdate example actually comprising six word sets which, in order, consist of the 8-numeral set, the all-numeral set, the 2-numeral set, the all-numeral set, the 4-numeral set and the all-numeral set.

In the system according to the present invention, the input sequence is separated into all possible combinations of partial patterns which might correspond to the spoken words. The input pattern is separated into a number, e.g. 100, of feature vectors and each feature vector is selected as a possible end point for one of the spoken words. All possible partial patterns ending with this feature vector are then compared with reference patterns representing the words which may be included in the input sequence, and elementary similarity measures are generated representing the degree of similarity between each reference pattern and each possible partial pattern. The similarity measures of all possible partial patterns are then examined to determine which combination of partial patterns will yield the highest total similarity to a sequence of reference words which is permitted by the predetermined format, and the sequence of reference words which is most similar to some possible combination of partial patterns will be provided as a decoded output.

Briefly, the determination of the optimum parallel pattern combination, or concatenation, is achieved in the following manner. First, a partial pattern end point q is selected and all reference patterns are then sequentially specified. For each reference pattern $B^n$, and for said partial pattern end point of a plurality of partial pattern starting points p are specified which, in conjunction with said end point q, may define a partial pattern representing a spoken one of the reference words. This is continued until for this specified end point q, and for each combination of $B^n$ and p, an elementary similarity measure $S(A)p,q)$, $B^n)$ is generated representing the degree of similarity between each reference pattern $B^n$ and each partial pattern $A(p,q)$ having a starting point p and said end point q. In a second stage of the first step, still with the same end point q, the possible start points p are sequentially specified. For each specified start point p, the word sets (e.g. sets 1–6 in the birthdate example) are sequentially specified, and for each specified word set the permitted words in that set (e.g. 0, 1, 2 and 3 in set 5 of the birthdate example) are sequentially specified. For each specified word set, the elementary similarity measures between the words in that set and the currently specified start and end points are examined and the maximum of these elementary similarity measures and the corresponding reference pattern are stored as partial similarity measures and partial recognition results, respectively. Thus, for the currently specified end point q and for each possible starting point p, a maximum partial similarity measure and corresponding recognition partial recognition result are stored for each of the word sets.

Next, in a second step of matching, still with the same specified end point q, the word sets in the permitted format are again sequentially specified and, for each word set, the possible partial pattern starting points p are specified and partial similarity measures are summed to calculate recurrence values T(q, x). Once this is completed, the currently specified end point q is then incremented to q+1, and the above-described process is repeated. This is continued until the end point q has been successively incremented to a value I representing the end point of the input pattern sequence, and the recurrence values are examined for maximum at each increment of q. Thus, when the process is completed, the maximum recurrence values stored in the system will represent the optimum segmentation points as well as the reference pattern sequence which yields the highest degree of similarity. This reference pattern sequence is then provided as an output.

As will be appreciated, the maximization problem to be solved by the recognition system according to the present invention is represented by $$T = \max_{p(x)} \sum_{x=1}^{K} \max_{n(x) \in f_x} \hat{S}(p(x-1), p(x), n(x)),$$

where the first above-described step in the recognition process is the solving of the inner maxima to obtain partial similarity measures designated by:

$$S(p, q, x) = \max_{n \in f_x} \hat{S}(p, q, n)$$

and the second step of the recognition process is the solving of the outer maxima by successively calculating recurrence values T(q,x) by the use of the recurrence formula:

$$T(q, x) = \max_{p<q} [T(p, x-1) + \hat{S}(p, q, x)],$$

for x=1, 2, ... k ... K where K is the number of word sets in the input sequence, and q=1, 2 ... I, where I is the number of feature vectors into which the input sequence has been divided.

A system to which this invention is applicable is for recognizing an input pattern A by the use of a format in which at least two word sets $\{W\}_w$ (w representing at least two integers that do not exceed a predetermined integer K), ech consisting of at least one elementary reference word unit W, are sequentially arranged as a sequence of word sets $\{W\}_x$ (x=1, 2, ..., k, ..., K). The input pattern A is produced with a plurality of actually spoken input word units selected from the respective word sets $\{W\}_x$ of the sequence. The system includes input means responsive to the input pattern A for producing a time sequence of input pattern feature vectors $a_1, a_2, ..., a_i, ..., a_I$, I in number, representative of the input pattern A, input pattern buffer memory means for memorizing at least a preselected number of successive input pattern feature vectors at a time, and reference pattern memory means for memorizing a plurality of time sequences, N in number, of reference pattern feature vectors. The reference pattern feature vector sequences are representative of elementary reference patterns $B^c$ (c=1, 2, ..., n, ..., N), respectively. The reference patterns $B^c$ are produced with the reference word units of the at least two word sets $\{W\}_w$ individually spoken, each reference word unit in at least one manner of pronunciation. According to this invention, the system comprises format specifying means for successively specifying the word sets $\{W\}_x$ of the sequence and the predetermined integer K and matching means connected to the input pattern buffer memory means, the reference pattern memory means, and the format specifying means for producing as a result of recognition of the input pattern A an output signal specifying a concatenation of optimum ones $B^{\mathring{n}(1)}$, $B^{\mathring{n}(2)}$, ..., $B^{\mathring{n}(k)}$, ..., and $B^{\mathring{n}(K)}$ of the reference patterns $B^c$ with the optimum reference patterns $B^{\mathring{n}(x)}$ decided by finding a maximum of similarity measures $S(A, \bar{B})$'s between the input pattern A and a plurality of reference pattern concatenations $\bar{B}$'s each reference pattern concatenation consisting of reference patterns $B^{n(x)}$, equal in number to the specified integer K, selected from the reference patterns $B^c$ in consideration of the successively specified word sets $\{W\}_x$, respectively.

The input word units may be spoken either continuously or more or less on a word by word basis. It is presumed in the following that the input word units are continuously spoken.

DESCRIPTION OF THE PREFERRED EMBODIMENTS

It should be remembered throughout the description that a continuous speech recognition system according to the present invention is applicable to recognition of an input pattern A representative of a succession of input word units, K in number, continuously spoken in the order of a first input word unit to a K-th input word unit according to a prescribed format F, where K represents a predetermined integer. Inasmuch as input word units of each succession are spoken according to a certain format F, the predetermined integer K is equal at least to two, although a continuous speech recognition system according to this invention is capable of recognizing a single spoken word as well. As is usual in continuous speech recognition systems in which the technique of pattern matching is resorted to, a prescribed number N of elementary reference patterns $B^c$ (c=1, 2, ..., n, ..., N) are provided for a plurality of individually spoken elementary reference word units of a vocabulary that comprises the input word units of various successions to be recognized. It is possible to presume without loss of generality that the reference patterns $B^c$ are in one-to-one correspondence to the reference word units. This is merely for simplifying the description, that is, merely for identifying the respective reference word units simply by natural numbers c or 1, 2, ..., and N, which numbers will be called reference word-identifying numbers or integers.

With input speech sound of continuously spoken input word units of a succession analysed by a spectrum analyser or the like, sampled at a predetermined sampling interval of, for example, about 20 milliseconds, and then digitized, it is possible to represent an input pattern A by a time sequence of first to I-th input pattern feature vectors as:

$$A = a_1, a_2, \ldots, a_i, \ldots, a_I, \quad (1)$$

where I represents the number of feature vectors $a_i$'s in the input pattern feature vector sequence, namely, that duration of the sequence or of the input pattern A which may be called an input pattern duration. Likewise, the reference patterns $B^c$ are represented by sequences of first to $J^c$-th reference pattern feature vectors as:

$$B^c = b_1{}^c, b_2{}^c, \ldots, b_j{}^c, \ldots, b_{Jc}{}^c, \quad (2)$$

where $J^c$ (written as Jc in a simplified manner in Equations (2) for c=1, 2, ..., N) represent durations of the respective reference pattern feature vector sequences. The shortest and the longest durations for the reference patterns $B^c$ will be denoted by $minJ^c$ and $maxJ^c$.

Each input pattern feature vector or an i-th one $a_i$ is represented by:

$$a_i = (a_{i1}, a_{i2}, \ldots, a_{iM}),$$

where $a_{i1}$ and so forth represent the vector components, M in number. Reference pattern feature vectors $b_j{}^c$ are given by:

$$b_j{}^c = (b_{j1}{}^c, b_{j2}{}^c, \ldots, b_{jM}{}^c),$$

where $b_{j1}{}^c$ and so on represent the vector components, again M in number.

A format F used in describing the operation or function of a continuous speech recognition system according to this invention is specified by a sequence of first to K-th word sets as:

$$F = f_1, f_2, \ldots, f_k, \ldots, f_K, \quad (3)$$

where each word set or a k-th word set $f_k$ consists of at least one of the reference word units, which can be designated generally by c. It is possible more in general to represent each word set $f_k$ by $\{K\}_k$, where W represents one or more of the reference word units c, for each of which two or more reference patterns may be provided rather than only one reference pattern. The word set sequence $f_1, f_2, \ldots, f_k, \ldots,$ and $f_K$ is formed by sequentially arranging at least two word sets $\{W\}_w$ (w representing at least two integers that do not exceed K) with the reference word units W or W's of the vocabulary grouped into the at least two word sets $\{W\}_w$ with or without one or more reference word units of the vocabulary used in common in the at least two word sets $\{W\}_w$. The word sets $f_1$ to $f_K$ of the sequence may be designated by $f_x$ (x=1, 2, ..., k, ..., K). Input word units of each succession should belong to the respective word sets $f_x$. The number of word sets $f_x$ in the sequence is therefore equal to K. The x-th input word units of the succession correspond to the x-th word sets $f_x$, respectively. For the example of birth dates, the x-th word sets $f_x$ or $\{W\}_x$ are given by:

$$f_x = \{c_x{}^1, c_x{}^2, \ldots, c_x{}^{mx}\}, \tag{4}$$

where $c_x{}^1$ and others, $m^x$ (written as mx again in a simplified fashion in Equations (4) for $x = 1, 2, \ldots, K$) in number, represent those two, four, eight, and ten of the reference word units c of which the x-th word sets $f_x$ consist. First to K-th sets of reference word-identifying integers of the respective word sets $f_x$ will be designated by c(x) or c(1), c(2), ..., c(k), ..., and c(K). A sequence of first to K-th reference word-identifying integers, K in number, one from each word set $f_k$, will be denoted by n(x) or n(1), n(2), ..., n(k), ..., and n(K).

A similarity measure between a first pattern A and a second pattern B is represented by S(A, B). As discussed in U.S. Pat. Nos. 4,059,725 and 4,049,913 referred to hereinabove, the similarity measure S(A, B) may be defined by:

$$S(A, B) = \max_{j=j(i)} \sum_{i=1}^{I} s(i, j), \tag{5}$$

where j(i) represents a monotonously increasing function of an independent variable i, for which $$j(I) = 1$$

and $$j(I) = J$$

and s(i, j) represents a scalar product of each feature vector $a_i$ of the first pattern A and each feature vector $b_j$ of a sequence of second pattern feature vectors $b_1, b_2, \ldots, b_j, \ldots,$ and $b_J$, J in number, of the second pattern B.

Merely for simplicity of representation, vectors $a_i$, $b_j{}^c$, and others will be denoted by $a_i$, $b_j{}^c$, and so on in the following unless the vector notations are desirable for some reason or other. It may also be mentioned here that signals are often designated by the same reference symbols as the respective conductors therefor and referred to by the quantities they represent, respectively. It is known in the art that the number of feature vectors $b_j$'s for each reference pattern B varies from about fifteen to about twenty-five when the reference pattern B represents a single reference word.

Figure 1:
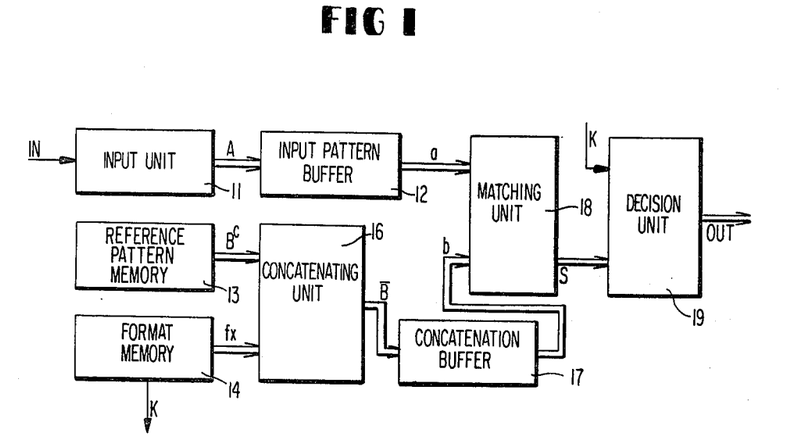
FIG. 1 is a block diagram of a continuous speech recognition system for use in describing the principles of the instant invention.

Referring now to FIG. 1, a continuous speech recognition system shown therein is for describing the principles of this invention. The system is for supplying an electronic digital computer (not shown) with input data consisting of birth dates. Speech sound or a voice signal supplied to the system through an input lead IN for each birth date is processed by a speech analyser or input unit 11 into an input pattern A given by Equation (1). The input pattern feature vectors $a_i$'s are successively supplied to an input pattern buffer memory 12 for temporarily memorizing a preselected number of the feature vectors $a_i$'s. A prescribed number N of elementary reference patterns $B^c$ defined by Equations (2) are memorized in a reference pattern memory 13. It is presumed merely for simplicity of description that only ten reference patterns $B^c$, namely, $B^0, B^1, \ldots, B^n, \ldots,$ and $B^9$, are used for elementary reference word units, herein numerals, c or 0, 1, ..., n, ..., and 9, respectively. The input unit 11 may be a spectrum analyzer that is referred to by Louis C. W. Pols in an article he contributed to IEEE Transactions on Computers, Vol. C-20, No. 9 (September issue, 1971), pages 972–978, under the title of "Real-Time Recognition of Spoken Words," in FIG. 1, at band filters, log, detection, multiplexer, and ADC.

Further referring to FIG. 1, a format memory 14 is for memorizing a format F specified by Equation (3) and is capable of successively producing the word sets $f_x$ described in conjunction with Equations (4) either in the order of the suffixes x or otherwise. The format memory 14 furthermore produces a signal representative of the predetermined integer K, namely, the number of the word sets $f_x$. For the example of birth dates, the predetermined integer K is equal to six. The x-th or first to sixth word sets $f_x$ are given by:

$$f_1 = \{0, 1, 2, 3, 4, 5, 6, 7\},$$
$$f_3 = \{0, 1\},$$
$$f_5 = \{0, 1, 2, 3\},$$
$$\text{and } f_2 = f_4 = f_6 = \{0, 1, 2, 3, 4, 5, 6, 7, 8, 9\},$$

where 0 to 9 represent the numerals 0 to 9 used as the reference word units, rather than the reference word-identifying integers. In practice, the format memory 14 memorizes those of the reference word-identifying integers c or 1 to N which identify the reference word units of the respective word sets $f_x$.

In FIG. 1, a concatenating unit 16 is for concatenating those first to K-th specific reference patterns $B^{n(x)}$ into a reference pattern concatenation $\overline{B}$ which are selected, from the reference patterns $B^c$ memorized in the reference pattern memory 13, with reference to the respective word sets $f_x$ successively specified by the format memory 14. Some or all of specific reference word units n(x) represented by the specific reference patterns $B^{n(x)}$ may be one and the same reference word unit. Each reference pattern concatenation $\overline{B}$ is specified by:

$$\overline{B} = B^{n(1)} \oplus B^{n(2)} \oplus \ldots \oplus B^{n(k)} \oplus \ldots \oplus B^{n(K)},$$

where the operator $\oplus$ represents concatenating certain patterns. For example, $$B^y \oplus B^z = b_1{}^y, b_1{}^y, \ldots, b_{Jy}{}^y, b_1{}^z, b_2{}^z, \ldots, b_{Jz}{}^z,$$

where each of y and z represents one of the reference word-identifying integers c or 1 to N. The reference pattern concatenation $\overline{B}$ is therefore defined by a sequence of reference pattern concatenation feature vectors $b_j{}^{n(x)}$.

In connection with FIG. 1, it may be mentioned here that the reference pattern concatenations are equal in number to ${}_n\pi_K$ or $N^K$ if all permutations with repetition of all reference patterns $B^c$ are possible or allowable reference pattern concatenations. The number of actually allowable reference pattern concatenations $\overline{B}$'s is, however, less than $N\pi_K$ because of the restriction imposed on such concatenations $\overline{B}$'s by the format F. The feature vectors of the allowable reference pattern concatenations $\overline{B}$'s will be represented by $b_j{}^{c(x)}$. The concatenations $\overline{B}$'s are successively supplied to a concatenation buffer memory 17 for temporarily memorizing at least one thereof at a time. The concatenation buffer memory 17 is capable of successively producing the feature vectors of the currently memorized reference pattern concatenation. Inasmuch as the x-th reference word units n(x) in each concatenation are one each of the x-th word sets $\{c(x)\}$ or $f_x$, $$n(x) \in f_x. \tag{6}$$

In the system depicted in FIG. 1, a matching unit 18 is responsive to the input pattern feature vectors a's (suffix omitted) currently memorized in the input pattern buffer memory 12 and the reference pattern concatenation feature vectors b's (affixes omitted) currently memorized in the concatenation buffer memory 17 for implementing the technique of pattern matching between the input pattern A and each reference pattern concatenation $\bar{B}$ to thereby derive a similarity measure $S(A, \bar{B})$ therebetween. Similarity measures S's (argument omitted) are calculated for all allowable reference pattern concatenations $\bar{B}$'s. A decision unit 19 compares the similarity measures S's with one another and decides a maximum similarity measure maxS of the similarity measures S's to decide with reference to the specified integer K an optimum reference pattern concatenation $\bar{B}$ for which the maximum similarity measure maxS is calculated by the matching unit 18. First to K-th optimum reference word units n̂(x), namely, n̂(1), n̂(2), . . . , n̂(k), . . . , and n̂(K), of which reference patterns are concatenated into the optimum reference pattern concatenation $\bar{B}$ give the result of recognition and are supplied to an output lead OUT either in series or in parallel. Inasmuch as the allowable concatenations $\bar{B}$'s are restricted by the format F, the result of recognition never departs from the format F, with the liability of misrecognition nulled accordingly. As the case may be, it is preferred that the decision unit 19 should produce an output signal OUT that merely specifies either first to K-th optimum reference patterns $\bar{B}$ or $B^{\hat{n}(x)}$ of the optimum reference pattern concatenation $\bar{B}$ or the optimum reference word units n̂(x).

Reviewing operation of the system illustrated with reference to FIG. 1, it is understood that the above-described processes of recognition are to solve a maximization problem:

$$T = \max_{n(x) \in f_x} S(A, B^{n(1)} \oplus B^{n(2)} \oplus \ldots \oplus B^{n(K)}), \tag{7}$$

so as to find optimum parameters, namely, the optimum reference patterns $B^{\hat{n}(x)}$ or the optimum reference word units n̂(x), under the restrictions or conditions specified by Equations (6) for the respective specific reference patterns $B^{n(x)}$. Solving the maximization problem, however, requires a considerable amount of calculation. The number of permutations with repetition of six things out of ten is equal to $10^6$ as pointed out hereinabove. With the restriction given by the format F, the number of all allowable reference pattern concatenations $\bar{B}$'s is reduced to $8 \times 10 \times 3 \times 10 \times 4 \times 10 = 96,000$. For the example of sales, let the number of names of goods be only 90. Even with this small number, the number of all permutations with repetition amounts to $10^8$. With the format F, the number is reduced to $90 \times 10 \times 10 \times 10 < 10^5$. The format F therefore renders the illustrated system practical to an appreciable extent. At any rate, it is preferred that the maximization be divided into a few steps with a view to achieving a more practical speed of operation. Furthermore, the technique of dynamic programming is resorted to for a higher speed of operation. Incidentally, the units 16 to 19 serve in combination as a single unit for implementing pattern matching between an input pattern A and all allowable reference pattern concatenations $\bar{B}$'s at a time to produce an output signal OUT specifying the optimum reference word units n̂(x) or the like by finding a maximum of the similarity measures S's between the input pattern A and the concatenations $\bar{B}$'s.

Figure 2:
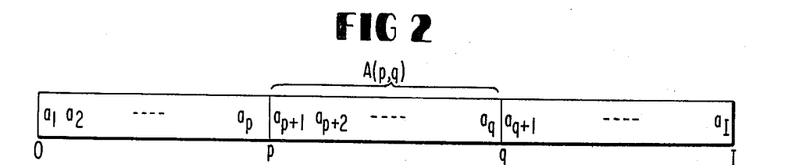
FIG. 2 shows an elementary partial pattern for use in describing the operation of a continuous speech recognition system according to this invention.

Turning to FIG. 2, a partial pattern A(p, q), which may be called an elementary partial pattern, is divided or segmented from an input pattern A. The partial pattern A(p, q) is defined by:

$$A(p, q) = a_{p+1}, a_{p+2}, \ldots, a_q,$$

where q represents one of integers between 2 and I, both 2 and I inclusive, and p, an integer that is not less than zero and not greater than q. The input pattern feature vectors $a_p$ and $a_q$ will be referred to as a start and an end point of the partial pattern A(p, q). In other words, an elementary pattern A(p, q) is situated in an input pattern A at a time position specified by the start and the end points p and q. It should be noted that the quantities represented by the symbols p and q are two integers for identifying a pair of input pattern feature vectors a's and are not essentially different from each other. It is therefore possible to represent an elementary partial pattern A(i, q) by A(i, p) provided that i is less than p and q. The same or another elementary partial pattern A(p, i) may be denoted by A(q, i) if p and q are less than i. The number of feature vectors a's of which a partial pattern, such as A(p, q), consist is called a duration of the partial pattern.

Figure 3:
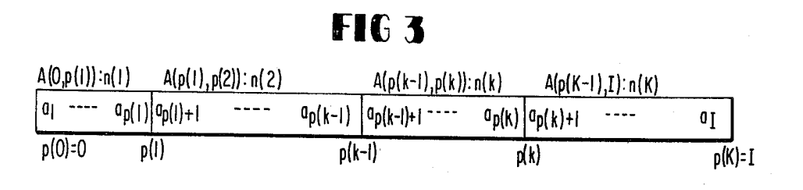
FIG. 3 is for illustrating a concatenation of specific partial patterns for an input pattern to be recognized by a system according to this invention.

Referring to FIG. 3, an input pattern A is divided or segmented at first to (K−1)-th segmentation points p(x), namely, p(1), p(2), . . . , p(k), . . . , and p(K−1), into first to K-th specific partial patterns A(p(x−1), p(x)), namely, A(p(0), p(1)), A(p(1), p(2)), . . . , A(p(k−1), p(k)), . . . , and A(p(K−1), p(K)). Each segmentation point p(k) is placed between two successive input pattern feature vectors $a_p(k)$ and $a_p(k+1)$ with points p(O) and p(K) situated immediately before the first feature vector $a_1$ and after the last or I-th feature vector $a_I$. The input pattern A is thus represented by a concatenation of such specific partial patterns. It is possible to represent one and the same input pattern A by various partial pattern concatenations. As the case may be, the points p(O) and p(K) are called the zeroth and the K-th segmentation points. The input pattern is thus represented by A(O, I). Each specific partial pattern A(p(k−1), p(k)) is one of the elementary partial patterns A(p, q)'s that has the start and end points at $a_{p(k-1)+1}$ and $a_{p(k)}$. In other words, an elementary partial pattern A(p, q) is segmented from an input pattern A at a pair of segmentation points p and q. The partial patterns A(p(x−1), p(x)) of each partial pattern concatenation are related to the first to the K-th specific reference patterns $B^{n(x)}$ of a reference pattern concatenation B, respectively, and consequently to the respective ones of the first to the K-th specific reference word units n(x) selected in any one of various manners from the respective word sets $f_x$. Incidentally, $$A = A(p(O), p(1)) \oplus A(p(1), p(2)) \oplus \ldots \oplus A(p(k-1), p(k)) \oplus \ldots \oplus A(p(K-1), p(K)). \tag{8}$$

According to this invention, it is unnecessary to select specific instants as the segmentation points $p(x)$ prior to recognition of an input pattern A. As will become clear as the description proceeds, the input pattern A is segmented at optimum segmentation points $p(x)$ when the decision unit 19 produces the result of recognition. When so segmented, a concatenation of optimum partial patterns $A(p(x-1), p(x))$ is identical with the optimum reference pattern concatenation B. In other words, the numbers of feature vectors in the respective optimum partial patterns $A(p(x-1), p(x))$ are automatically rendered coincident with those numbers of reference pattern feature vectors $b_j$'s of the respective reference patterns in the optimum concatenation which are warped or mapped to the time axis of the input word sequence.

Let practical processes carried out by a continuous speech recognition system according to a preferred embodiment of this invention be described for a short while. A similarity measure defined by Equation (5) satisfies:

$$S(A, B^y \oplus B^z) = \max_p [S(A(O, p), B^y) \oplus S(A(p, I), B^z)], \quad (9)$$

when either of the patterns A and B is subjected to concatenation or disconcatenation. By substituting Equation (8) into Equation (7) and by repeatedly rewriting the resulting equation by the use of Equation (9), the following equation results:

$$T = \max_{\substack{n(x) \in f_x \\ p(x)}} \sum_{x=1}^{K} S(p(x-1), p(x), n(x)) \text{ or} \quad (10)$$

$$T = \max_{p(x)} \sum_{x=1}^{K} \max_{n(x) \in f_x} S(p(x-1), p(x), n(x)),$$

where $S(p, q, n)$ represents an elementary similarity measure $S(A(p, q), B^n)$ between an elementary partial pattern $A(p, q)$ and an elementary reference pattern $B^n$. More particularly, an input pattern A is segmented for the inside maxima in Equation (10) at various sets of segmentation points $p(x)$'s into various partial pattern concatenations. The k-th specific partial patterns in these concatenations will be designated by $A(p(k-1), p(k))$'s. The k-th specific reference patterns in various reference pattern concatenations $\bar{B}$'s are $B^{n(x)}$'s. It should now be pointed out that the summation in Equation (10) is for $x=1$ to $x=K$. When $x=1$, $S(p(x-1), p(x), n(x))$ in the argument of the inside maximum represents what may be named a set of individual similarity measures $S(p(o), p(1), n(1))$'s where $n(1) \in f_1$. This means that the maximization is for the individual similarity measure set $S(p, q, c)$, under the restriction specified by Equation (6) for $x=1$, between combinations of the first specific partial patterns $A(p(0), p(1))$'s and the first specific reference patterns $B^{n(1)}$'s. Maximization problems for other values of x will now be self-explanatory. Incidentally, Equation (10) shows that the practical processes consist of a few steps.

A former stage of a first step is a step of pattern matching. In the former stage, various elementary partial patterns $A(p, q)$'s are segmented from an input pattern A, each for comparison with all elementary reference patterns $B^c$. For comparison with the elementary reference patterns $B^c$, durations of these partial patterns $A(P, Q)$'s need not be shorter than $\min J^c - r$ and longer than $\max J^c + r$, where r represents an integer known as a width of a normalization window or a length of an adjustment window in the art. Herein, such elementary partial patterns $A(P, Q)$'s are called possible partial patterns and written again as $A(p, q)$'s. Similarity measures $S(p, q, c)$'s for all possible partial patterns $A(p, q)$'s and all reference patterns $B^c$ are called various sets of elementary similarity measures. The elementary similarity measures $S(p, q, c)$'s will become equal to unity or approximately equal thereto only when each possible partial pattern $A(p, q)$ is placed at or near the time position for a certain one of the input word units. Otherwise, the elementary similarity measures $S(p, q, c)$'s are equal to zero or infinitesimally small. In a latter stage of the first step, the maxima of the elementary similarity measures $S(p, q, c)$'s are calculated under the restrictions specified by Equations (6). It is now understood that $\max S(p(0), p(1), n(1))$, under the condition such that $n(1) \in f_1$ is given by that at least one of the individual similarity measure set $S(A(0, q), B^{n(1)})$ which is calculated between a first specific partial pattern $A(p(0), p(1))$ and a first specific reference pattern $B^{n(1)}$ presumably representative of a first optimum reference word unit $n(1)$. Maxima for other values of x are now self-evident. The maxima are called partial similarity measures and designated by $\hat{S}(p, q, x)$'s. Specific reference patterns $B^{n(x)}$ that presumably represent the respective optimum reference word units $\hat{n}(x)$ or the reference word units $n(x)$ represented by such specific reference patterns $B^{n(x)}$, respectively, are referred to as partial recognition results and denoted by $\hat{N}(p, q, x)$'s. That is:

$$\hat{S}(p, q, x) = \max_{n \in f_x} S(p, q, n) \text{ and} \quad (11)$$

$$\hat{N}(p, q, x) = \arg\max_{n \in f_x} S(p, q, n). \quad (12)$$

Inasmuch as the symbol x represents 1 through K, it is possible to write the partial similarity measure and recognition results as $\hat{S}(p,q,k)$'s and $\hat{N}(p,q,k)$'s.

A second step is another step of pattern matching. In the second step, the maximization problem given by the outside maximum, namely, $$T = \max_{p(x)} \sum_{x=1}^{K} \hat{S}(p, q, x), \quad (13)$$

is solved. In practice, the maximum defined by Equation (13) is determined by successively calculating recurrence values $T(q, z)$ by the use of a recurrence formula:

$$T(q, x) = \max_{p<q} [T(p, x-1) + \hat{S}(p, q, x)], \quad (14)$$

for $x = 1, 2, \ldots, k, \ldots, K$ and $q = 1, 2, \ldots, i, \ldots, I$, starting at an initial condition:

$$T(O, O) = 0,$$

in an ascending order for each of x and q. For convenience, one of the provisional segmentation point pair $p(x-1)$ or $p(q, x)$, x) to be paired with the other $p(x)$ or q is simultaneously calculated according to:

$$P(q, x) = \arg\max_{p<q} [T(p, x-1) + S(p, q, x)], \quad (15)$$

in an ascending order for each of x and q. It is preferred that x is successively increased with q temporarily set at a certain value. This means that Equations (14) and (15) are solved at first for each possible partial pattern (A(0, q) as a whole (x=1), then with each of such possible partial patterns A(0, q)'s segmented successively into a concatenation of two provisionally segmented specific partial patterns A(0, P(q, 1)) and A(P(q, 1), q), another concatenation of three provisionally segmented specific partial patterns A(0, P(q, 1)), A(P(q, 1), P(q, 2)), and A(P(q, 2), q), . . . , and finally with the whole input pattern A or A(0, I) segmented into a concatenation of provisionally segmented specific partial patterns A(0, P(q, 1)), A(P(q, 1), P(q, 2)), . . . , and A(P(q, k−1), I), K in number. Furthermore, provisional recognition results N(q, x) are calculated by:

$$N(q, x) = \hat{N}(\hat{p}, q, x), \tag{16}$$

where p represents P(q, x).

In a decision step, the first to the K-th optimum segmentation points $\hat{p}(x)$ or $\hat{p}(1), \hat{p}(2), \ldots, \hat{p}(k), \ldots,$ and $\hat{p}(K)$ are selected from the provisional segmentation points P(q, x). In practice, the selection is carried out by reviewing the provisional segmentation points P(q, x) by a recurrence formula:

$$\hat{p}(x) = P(\hat{p}(x+1), x+1), \tag{17}$$

successively for x = K−1, K−2, . . . , 1, starting at an initial condition:

$$\hat{p}(K) = I,$$

for x = K. By reviewing Equation (16) or referring directly to Equation (12) in consideration of the optimum segmentation points p(x), it is possible to decide optimum recognition results or optimum reference word units $\hat{n}(x)$ by:

$$\hat{n}(x) = N(\hat{p}(x), x) \tag{18}$$

or $$\hat{n}(x) = \hat{N}(\hat{p}(x-1), \hat{p}(x), x), \tag{19}$$

successively for x = K, K−1, . . . , 1.

Figure 4:
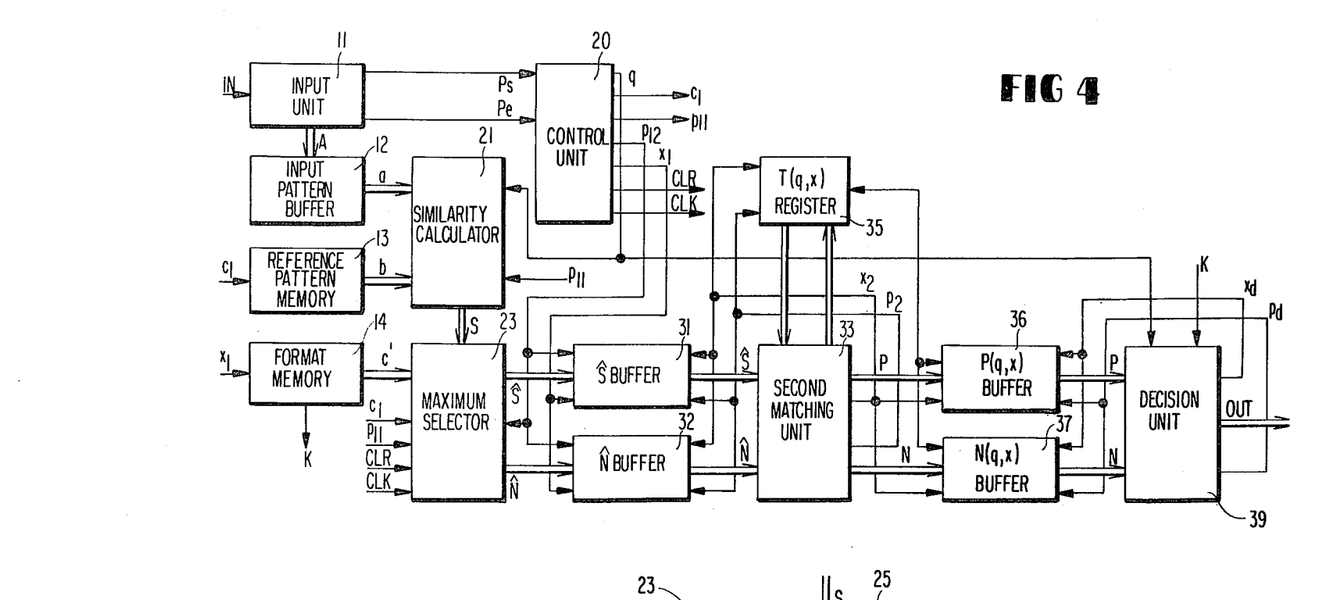
FIG. 4 is a block diagram of a continuous speech recognition system according to a practical embodiment of this invention.

Referring now to FIG. 4, a continuous speech recognition system according to a practical embodiment of this invention is shown for carrying out the above-described practical processes with high efficiency. The illustrated system comprises an input lead IN, an input unit 11, an input pattern buffer memory 12, a reference pattern memory 13, a format memory 14, and an output lead OUT, all similar to the corresponding parts described in conjunction with the system illustrated with reference to FIG. 1. Similar signals are designated by reference symbols except for the symbols b and S that now denote a signal representative of the reference pattern feature vectors $b_j^c$ rather than the reference pattern concatenation feature vectors $b_j^{c(x)}$ and another signal representative of elementary similarity measures S(p, q, c)'s rather than the similarity measures between each input pattern A and all allowable reference pattern concatenations B̄'s. The concatenating unit 16, the concatenation buffer memory 17, the matching unit 18, and the decision unit 19 are modified as will presently be described. The example of birth dates will again be referred to.

Figure 5:
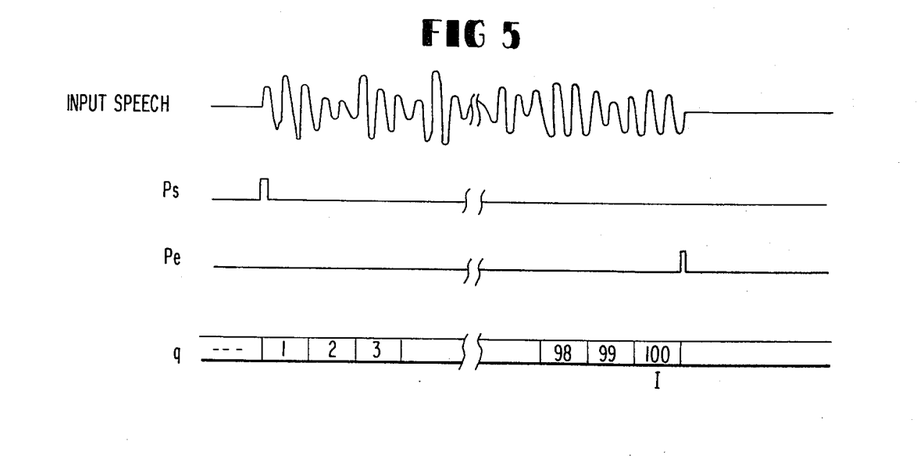
FIG. 5 is a time chart of, among others, an input speech sound waveform to be recognized by the system shown in FIG. 4 and a counter signal produced in the system.

Referring again to FIG. 4 and afresh to FIG. 5, the input unit 11 detects the energy of the input speech sound and produces a start pulse Ps and an end pulse Pe at the start and the end of the continuous speech sound. Responsive to the start pulse Ps, a control unit 20 produces various control signals and pulses. For example, the control unit 20 includes a counter (not shown) put by the start pulse Ps into operation of counting up sampling pulses from unity upwards until the end pulse Pe is produced. One or more sampling intervals after appearance of the end pulse Pe, the counter is cleared. The sampling pulses may be generated in the control unit 20 and supplied to the input unit 11 as described in U.S. Pat. No. 4,049,913, referred to hereinabove, with reference to FIG. 1 thereof. At any rate, the control unit 20 produces a counter signal q representative of the stepwise increasing count that corresponds to the suffixes i's attached to the input pattern feature vectors a's. In the example illustrated in FIG. 5, the counter signal q has values variable from unity consecutively up to 100. This means that the input pattern A consists of one hundred feature vectors $a_1$ through $a_{100}$. The counter signal q is used to successively specify the end points q's of possible partial patterns A(p, q)'s for the purpose discussed in U.S. Pat. No. 4,059,725, also cited hereinabove, in connection with the second embodiment of the invention disclosed therein. It is possible to make the counter further count up regardless of appearance of the end pulse Pe until completion of recognition of an input pattern A.

Figure 6:
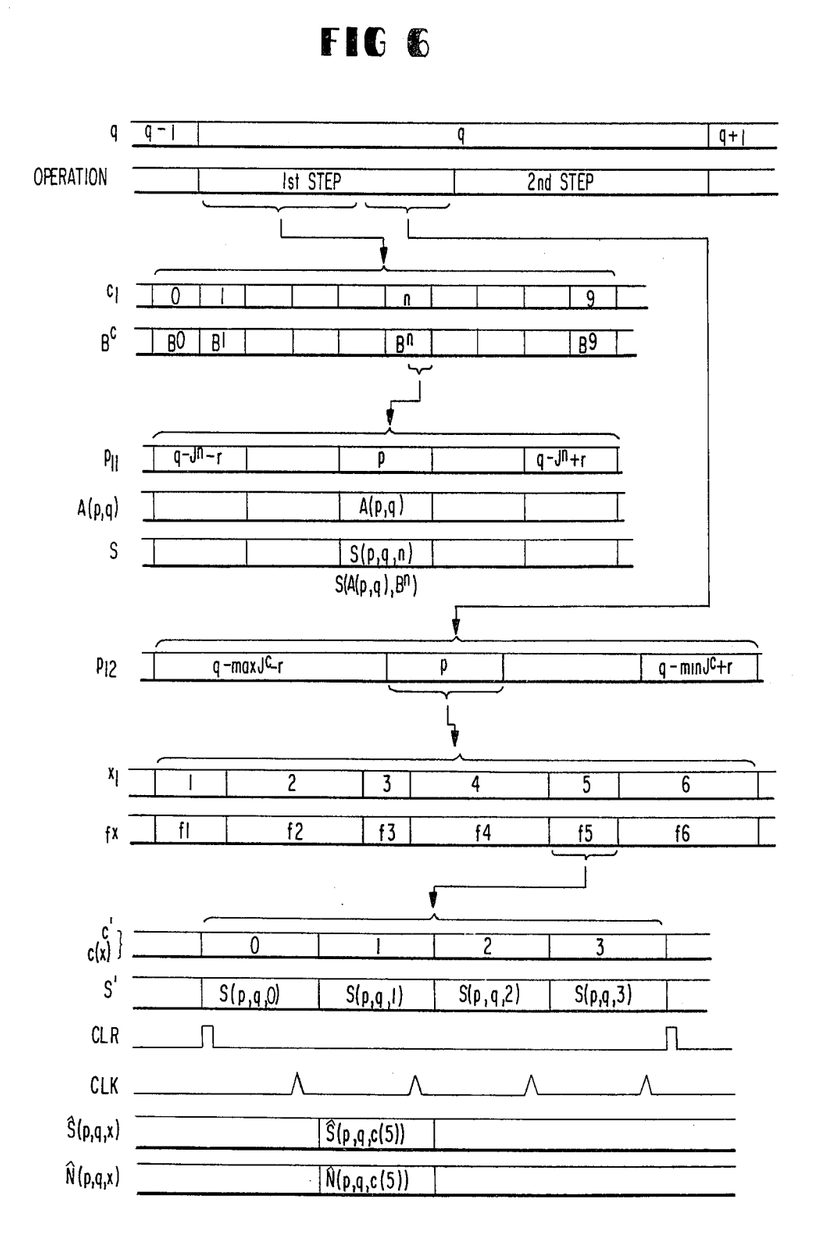
FIG. 6 is a time chart for describing a first step of operation of the system depicted in FIG. 4.

Referring once more to FIG. 4 and anew to FIG. 6, the input pattern feature vectors a's successively supplied from the input unit 11 to the input pattern buffer memory 12 are supplied, in turn, to a similarity calculator 21. The first and the second steps are continuously carried out in a former and a latter part of a duration of time in which the counter signal q represents a certain count, such as q. At this instant, a plurality of input pattern feature vectors a's ending at $a_q$ are supplied to the similarity calculator 21. It is possible to select from the feature vectors a's a set of possible partial patterns A(p, q)'s having a common end point at q. For the former stage of the first step, the control unit 20 produces a reference pattern specifying signal $c_1$ that has values variable from 1 to N or 0 to 9 during earlier part of the former stage to specify those addresses of the reference pattern memory 13 in which the reference patterns $B^c$ ($B^1$ to $B^N$) or $B^0$ to $B^9$ are memorized, respectively. It is to be noted here that the exemplified order in which the addresses are accessed is merely for simplicity of description. The reference pattern memory 13 successively produces the reference pattern feature vectors b's of the respective reference patterns $B^c$ or $B^0, B^1, \ldots, B^n, \ldots,$ and $B^9$. When supplied with one of the reference patterns $B^c$, such as $B^n$, the similarity calculator 21 calculates a set of elementary similarity measures S(p, q, n)'s between the partial patterns A(p, q)'s and that reference pattern $B^n$. In this manner, the similarity calculator 21 successively calculates a group of elementary similarity measures S(p, q, c) between the partial patterns A(p, q)'s and the reference patterns $B^c$. As will be described in the following, the start point of the partial pattern A(p,q) is varied through a certain range while each reference pattern $B^n$ is specified.

On calculating an elementary similarity measure S(p, q, n) between a certain one of the partial patterns A(p, q) and a currently produced reference pattern $B^n$, it is possible to resort to the dynamic programming technique. More specifically, recurrence coefficients g(i, j)'s, as named herein, are calculated as discussed in detail in the above-cited U.S. Pat. Nos. 4,059,725 and 4,049,913 by the use of a recurrence formula:

$$g(i, j) = s(i, j) + \max \begin{bmatrix} g(i+1, j) \\ g(i+1, j+1) \\ g(i+1, j+2) \end{bmatrix},$$

successively for $j = J^n - 1, J^n - 2, \ldots, 1$, starting at initial conditions:

$$g(i, J^n) = s(q, J^n), \text{ for } i = q$$

and $$g(i, J^n) = 0, \text{ for } i \neq q.$$

It is sufficient that the recurrence formula be calculated only for those values of the suffixes i's that satisfy:

$$j + q - J^n - r \leq i \leq j + q - J^n + r,$$

where r, the normalization window width, is selected to be about 30% of the shortest reference pattern duration minJ$^c$. With this, it is possible to calculate the similarity measure S(p, q, n) as:

$$S(p, q, n) = g(p+1, 1).$$

During the calculation described in the next preceding paragraph, the elementary similarity measure set S(p, q, n)'s mentioned above are calculated for those values of the start point b's which satisfy:

$$q - J^n - r \leq p \leq q - J^n + r. \tag{20A}$$

With the reference patterns B$^c$ varied from one to another, the elementary similarity measure group S(p, q, c) is calculated. For the convenience of further description, the above-given range of the start points p's will be somewhat widened into:

$$q - \max J^c - r \leq p \leq q - \min J^c + r. \tag{20B}$$

Equation (20B) is in harmony with the durations of possible partial patterns A(p, q)'s mentioned in connection with the former stage of the first step. Incidentally, it is possible to begin calculation of various groups of elementary similarity measures S(p, q, c)'s for various sets of possible partial patterns A(p, q)'s as soon as the input pattern feature vectors $a_1, a_2, \ldots$, equal in number to minJ$^c$−r, are supplied from the input unit 11 to the input pattern buffer memory 12 if the shortest reference pattern is repeatedly produced from the reference pattern memory 13 at the beginning of cyclic production of the reference patterns B$^c$ for the respective counts q's successively represented by the counter signal q.

It is known in the art that the window width r may be about seven when maxJ$^c$=25 and min J$^c$=15. In this event, the length of the partial pattern A(p,q) is varied between about three and about thirty-two input pattern feature vectors provided that the number of input pattern feature vectors is counted with the time axis of the input pattern A optimally warped to the time axes of the respective reference patterns B$^c$.

Turning back to FIGS. 4 and 6, the similarity calculator 21 may be of the structure and operation described in U.S. Pat. No. 4,049,913, cited hereinabove, with reference to FIG. 2 thereof. In the example being illustrated, the control unit 20 supplies the similarity calculator 21 with a first partial pattern start point specifying signal $p_{11}$ having values variable in the range defined by Equation (20A) in a later portion of each of durations in which the reference pattern specifying signal $c_1$ specifies the respective reference patterns B$^c$. In synchronism with the signal $p_{11}$, the similarity measure calculator 21 delivers a successively varying elementary similarity measure signal S representative of the elementary similarity measures S(p, q, c) to a maximum selector 23 that selects a maximum of each group of elementary similarity measures S(p, q, c) in consideration of the format F in a manner to be described in the following.

Figure 7:
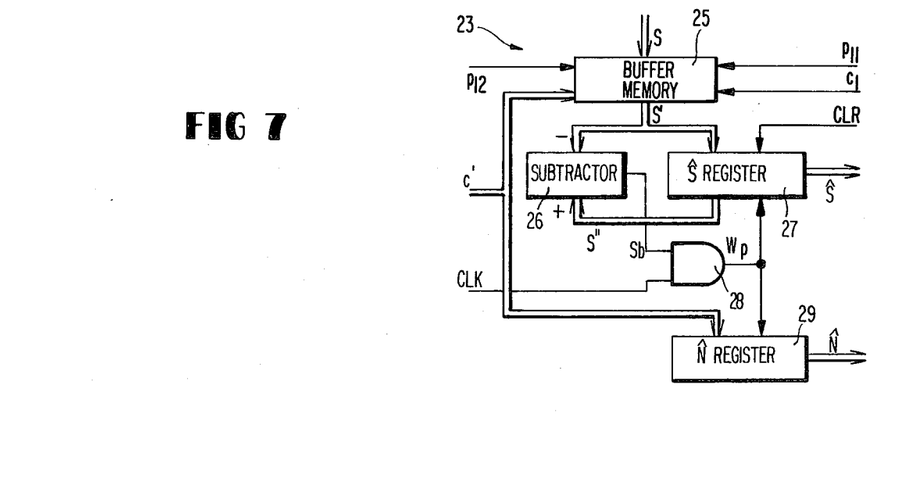
FIG. 7 is a block diagram of a maximum selector for use in the system illustrated in FIG. 4.

Referring now to FIG. 7 in addition to FIGS. 4 and 6, the maximum selector 23 comprises a buffer memory 25 for temporarily memorizing a group of elementary similarity measures S(p, q, c) in its addresses specified by the reference pattern specifying signal $c_1$ and the first partial pattern start point specifying signal $p_{11}$ of the values for which the elementary similarity measures S(p, q, c) are successively calculated. The latter stage of the first step now begins, with the control unit 20 made to produce a second partial pattern start point specifying signal $p_{12}$ having values variable only once in the range defined by Equation (20B). During the time in which the signal $p_{12}$ specifies a certain value, such as p, the control unit 20 produces a word set specifying signal $x_1$ having values that vary to specify those sectors of the format memory 14 in which the respective word sets $f_x$ of the sequence are preliminarily stored. When the signal $x_1$ specifies a k-th sector, the format memory 14 produces a reference word specifying signal c' that successively represents the reference word units $c_k^1$ and so forth or c(k) given by a pertinent one of Equations (4). When the fifth word set $f_5$ is currently specified, the reference word-identifying integers c(5) or 0, 1, 2, and 3 are sequentially produced. Accessed by the second partial pattern start point specifying signal $p_{12}$ and the reference word specifying signal c' produced during the time in which the word set specifying signal $x_1$ has a specific value, the buffer memory 25 successively delivers the elementary similarity measures S(p, q, c) as a read-out elementary similarity measure signal S' to a subtractor 26 and towards a partial similarity measure register 27. If no elementary similarity measures S(p, q, c) of finite values are memorized in the accessed address, the signal S' is made to represent a sufficiently negative value.

More specifically referring to FIGS. 4, 6, and 7, the control unit 20 produces a clear pulse CLR for resetting the partial similarity measure register 27 to zero each time when the values of the word set specifying signal $x_1$ vary from one to another. Let it be assumed that the signal $x_1$ currently specifies the fifth word set $f_5$ and that the reference word specifying signal c' successively specifies the reference word units c(5) of the fifth word set $f_5$. When the reference word unit 0 is specified, the read-out elementary similarity measure signal S' represents the elementary similarity measure S(p, q, 0), which is supplied to the subtractor 26. A register content signal S'' representative of the current content of the register 27 is supplied always to the subtractor 26. The subtractor 26 subtracts the similarity measure S(p, q, 0) from the content, which is now zero, to deliver a sign bit signal Sb to an AND gate 28. The control unit 20 produces clock pulses CLK, in timed relation to which the reference word specifying signal c' specifies the successive reference word units (now, word units 0, 1, 2, and 3). In response to the sign bit signal Sb representative of the minus sign, a write-in pulse Wp is delivered from the AND gate 28 to the register 27 to store the similarity measure S(p, q, 0) in the latter. In this manner, the register 27 retains a maximum of a group of elementary similarity measures S(p, q, c(5)), namely, S(p, q, 0), S(p, q, 1), S(p, q, 2), and S(p, q, 3). As defined in Equation (11), the maximum is a partial similarity measure $\hat{S}(p, q, x)$ or now, a fifth partial similarity measure S(p, q, c(5)) or $\hat{S}(p, q, n(5))$ for the fifth word set $f_5$. The write-in pulse Wp is supplied also to a partial recognition result register 29. That value of the reference word specifying signal c' (now 0, 1, 2, and 3) in response to which the write-in pulse Wp is produced for the last time for the currently specified word set, such as the fifth word set $f_5$, is stored in the register 29 as a partial recognition result N(p, q, x) or now, a fifth partial recognition result $\hat{N}(p, q, c(5))$, defined by Equation (12).

In FIG. 4, the maximum selector 23 is accompanied by a partial similarity measure buffer 31 and a partial recognition result buffer 32. Each of the buffers 31 and 32 has addresses specified by the second partial pattern start point specifying signal $p_{12}$ and the word set specifying signal $x_1$. The partial similarity measures $\hat{S}(p, q, c(x))$ and the partial recognition results $\hat{N}(p, q, c(x))$ calculated for the currently represented count q and the successively specified word sets $f_x$ or c(x) are transferred to the addresses specified by the signals $p_{12}$ and $x_1$. It is, however, not seldom that the sign bit signal Sb (shown in FIG. 7) always represents the plus sign during the time that the value of the second partial pattern start point specifying signal $p_{12}$ is repeatedly varied for the respective word sets $f_x$ while the current count q is specified by the counter signal q. This shows that there are no specific partial patterns having a common end point at the current count q. Under the circumstances, no finite values are stored in the respective buffers 31 and 32.

Figure 8:
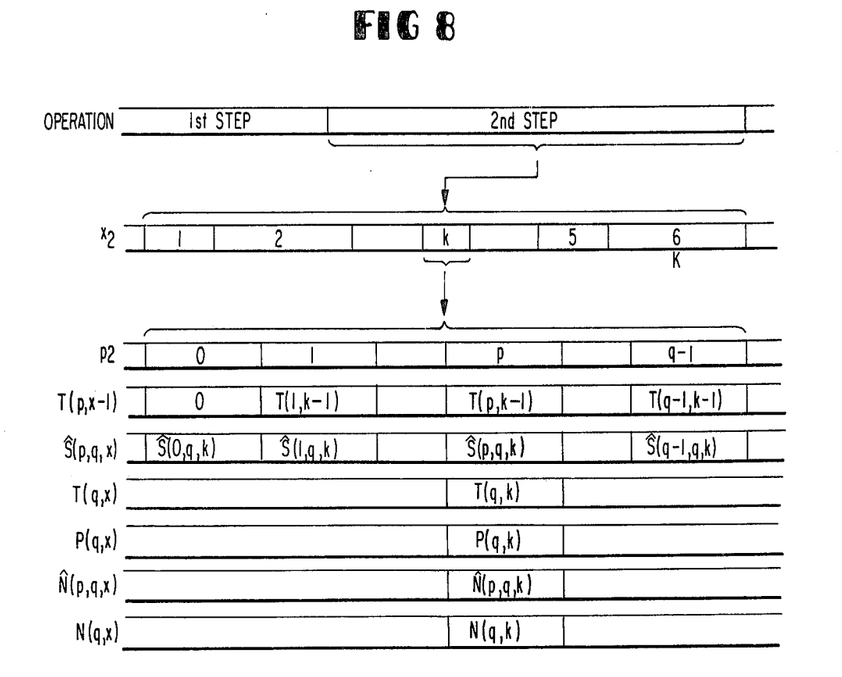
FIG. 8 is a time chart for describing a second step of operation of the system shown in FIG. 4.

Referring once again to FIG. 4 and newly to FIG. 8, the second step is carried out by a second matching unit 33 accompanied by a recurrence value register 35, a provisional segmentation point buffer 36, and a provisional recognition result buffer 37 in the latter part of the duration in which the counter signal q specifies a certain count, such as q. The second matching unit 33 and the accompanying parts 35, 36, and 37 may be similar in structure and operation to the corresponding parts described in the above-mentioned U.S. Pat. No. 4,059,725 with reference to FIGS. 8 and 10 thereof, except that a local word number signal $x_2$ is additionally used in accessing the partial similarity measure and recognition result buffers 31 and 32 and that the counter signal q is substituted for a local partial pattern end point specifying signal as is the case in U.S. Pat. No. 4,049,913 cited also hereinabove. As described in the closing paragraph of the last-cited U.S. Pat. No. 4,049,913, it is possible to make either of the control unit 20 and the second matching unit 33 produce for the second step a few control signals including the signal $x_2$. This applies to a few further signals used in the decision step. In the illustrated example, the signal $x_2$ is generated in the second matching unit 33 following the end of the second partial pattern start point specifying signal $p_{12}$ to successively specify those first to K-th integers or local word numbers x or 1, 2, . . . , k, . . . , and K which correspond to the first to the K-th values of the word set specifying signal $x_1$. During each interval of time in which the signal $x_2$ specifies a certain local word number, such as k, a segmentation point signal $p_2$ is produced to sequentially specify serial numbers as the partial pattern start points 0, 1, . . . , p, . . . , and q−1 as defined by the inequality for the maximization. It should be reminded that the partial pattern start points p's are not essentially different from their end points q's. Each of the register 35 and the buffers 36 and 37 may be deemed, for the time being, to consist of first to K-th elementary or partial registers (not shown) that are equal in number to K of word sets $f_x$ of a longest possible word set sequence and are accessible by the local word numbers x. Each partial register has first to I-th addresses that are equal in number to I of the duration of a longest possible input pattern A and are accessible by the counter signal q.

Further referring to FIGS. 4 and 8, the recurrence value register 35 is cleared before the similarity calculator 21 begins to calculate a first group of elementary similarity measures S(0, q, c). At an instant at which the value of the counter signal q is varied from a previous value q−1 to the above-mentioned current count q, the recurrence values T(q, x) are stored in the register 35 at addresses specified by the previous counts 1 to q−1 and the respective local word numbers 1 to K in the manner to be presently described. Let it be assumed that a current local word number k is specified by the local word number signal $x_2$. According as the start points 1 to q−1 are successively specified by the segmentation point signal $p_2$, previous recurrence values T(p, k−1), namely, T(1, k−1) to T(q−1, k−1), some or all of which may be equal to zero, are successively supplied to the second matching unit 33 from those addresses of the register 35 which are specified by the current local word number k and the successive partial pattern start points 1 to q−1. When the start point 0 is specified, zero is supplied to the unit 33. Similarly accessed, the partial similarity measure buffer 31 successively supplies the unit 33 with partial similarity measures $\hat{S}(p, q, k)$. A maximum, if any, of the successive sums is selected as a new finite recurrence value T(q, k) for the current local word number k and stored in the register 35 at an address specified by the current local word number k and the current count q. That value of the segmentation point signal $p_2$ at which the new recurrence value T(q, k), if any, is found is stored as a provisional segmentation point P(q, k) in the provisional segmentation point buffer 36 at an address specified also by k and q. Accessed by the segmentation point signal $p_2$ and the current local word number k, the partial recognition result buffer 32 supplies the unit 33 with the partial recognition result or results $\hat{N}(p, q, k)$. That one of the supplied partial recognition result or results which is supplied to the unit 33 at the moment of the last-mentioned value of the signal $p_2$ is selected by the unit 33 and stored as a provisional recognition result N(q, k) in a likewise specified address of the buffer 37 therefor.

Continuing the description with reference to FIGS. 4 and 8, the value of the local word number signal $x_2$ eventually reaches the predetermined integer K while the above-mentioned count q is currently specified. At this instant, recurrence values T(q, x) for the current count q are stored in the register 35. At least one each of provisional segmentation point and recognition result P(q, x) and N(q, x), if any, are stored in the respective buffers 36 and 37. The partial similarity measure and recognition result $\hat{S}(p, q, x)$ and $\hat{N}(p, q, x)$ are thus processed in the second step while the counter signal q is kept at the current count q. Addresses of the partial similarity measure and recognition result buffers 31 and 32 therefore need not be specified by the counter signal q.

When the count q increases to a next following value, the first and the second steps are again consecutively carried out. When the ultimate local word number K is specified during the interval in which the counter signal q is eventually made to represent the input pattern duration I, only one finite value the value T(I, K) is stored in the buffer 35, although the value is no more necessary contrary to the case for a system according to the first embodiment of the invention disclosed in the already-cited U.S. Pat. No. 4,049,913. This is because the end point of the K-th specific partial pattern in a partial pattern concatenation always coincides with the K-th segmentation point p(K), namely, the end point of the whole input pattern A, even though two or more maxima might have been determined during a next previous interval or cycle in which the (K−1)-th local word number K−1 is specified. The situation is similar to the cases described in the lastly cited U.S. Pat. No. 4,049,913 because the word (unit) number is automatically specified by the format F. Only one provisional segmentation point P(I, K) is always stored in the buffer 36 therefor at an address specified by the predetermined integer K and the input patter duration I. Only one provisional recognition result N(I, K) is stored in a similarly specified address of the buffer 37 therefor.

Figure 9:
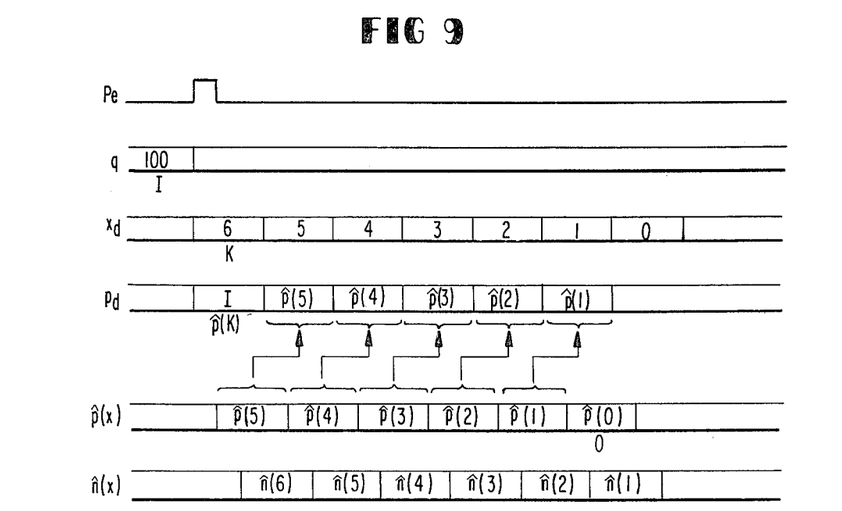
FIG. 9 is a time chart for illustrating a decision step of operation of the system depicted in FIG. 4.

Referring to FIG. 4 once again and to FIG. 9 for the first time, the continuous speech recognition system comprises a decision unit 39 that starts the decision step as soon as the end pulse Pe (depicted also in FIG. 5) is produced. The unit 39 may be similar in structure and operation to that described in the previously-cited U.S. Pat. No. 4,049,913 with reference to FIGS. 10 and 11 thereof. Responsive to a word set number signal K produced by the format memory 14, the unit 39 produces a decision word number signal $x_d$ that sequentially specifies decision word numbers K, K−1, ..., k, ..., and 0, now in the descending order, in the manner to be shortly described. The unit 39 furthermore produces an optimum segmentation point signal $p_d$ that successively represents the optimum segmentation points $\hat{p}(x)$ as will be described presently. The signal $p_d$ is given at first the current value I, namely, the input pattern duration, of the counter signal q. The current value I represents the K-th optimum segmentation point p(K). A provisional segmentation point P(p(K), K) is read from that address of the provisional segmentation point buffer 36 which is specified by the current decision word number and optimum segmentation point K and I according to Equation (17). This gives the (K−1)-th optimum segmentation point $\hat{p}(K-1)$, namely, the start point of the K-th specific input word unit of the optimum partial pattern concatenation. A provisional recognition result N(p̂(K), K) is read out of that address of the buffer 37 therefor which is accessed by the current decision word number K and the K-th optimum segmentation point I as is seen from Equation (18). This gives the K-th optimum recognition result or reference word unit $\hat{n}(K)$. As described hereinabove, the number of input pattern feature vectors of which the K-th optimum partial pattern A(p(K−1), I) is composed is decided to be [I−p(K−1)].

Further referring to FIGS. 4 and 9, the values of the signals $x_d$ and $P_d$ are renewed to K−1 and $\hat{p}(K-1)$. A provisional segmentation point P(p̂(K−1), K−1) is read from that address of the provisional segmentation point buffer 36 which is accessed by the renewed decision word number and optimum segmentation point K−1 and $\hat{p}(K-1)$. This results in only one (K−2)-th optimum segmentation point $\hat{p}(K-2)$. Likewise, only one (K−1)-th optimum reference word unit n(K−1) is read from the provisional recognition result buffer 37. Repeating such processes, optimum recognition results n(K−2), ..., and $\hat{n}(1)$ are successively read out. The decision word number x is eventually reduced to zero, when recognition of the input pattern A comes to an end. Alternatively, it is possible to make the partial recognition result buffer 32 memorize the partial recognition results $\hat{N}(p, q, x)$ at addresses specified also by the counter signal q and to read out the optimum recognition results $\hat{n}(x)$ therefrom according to Equation (19) in substantial conformity with the decision unit described in the last-cited U.S. Pat. No. 4,049,913 with reference to FIGS. 10 and 11 thereof. The optimum recognition results $\hat{n}(x)$ coincide with the reference word units in the optimum reference pattern concatenation $\hat{B}$ described in connection with FIG. 1.

While a few embodiments of this invention have so far been described together with several modifications thereof, this invention can be put into effect in various other ways as will readily be understood by those skilled in the art, particularly when the above-referenced U.S. Pat. No. 4,049,913 is referred to. For example, it is possible to specify the format F by speaking the word sets $f_x$ of the format F to be specified successively to a system according to this invention as described in the cited U.S. Pat. No. 4,049,913 in conjunction with a system according to the second embodiment of the invention revealed therein. It is possible to define elementary similarity measures S(p, q, n) in various other manners, with minimization substituted for the maximization as the case may be. The input word units may be pronounced more or less on a word by word basis because it is possible to suppress production of the end pulse Pe when a pause between two successive input word units is not longer than a predetermined duration. A system according to this invention is capable of recognizing only one discretely spoken word or word unit provided that the word set number signal K produced by the format memory 14 is made to represent unity and that there is at least one elementary reference pattern in the first word set $f_1$. The similarity calculator 21 and/or the second matching unit 33 may be composed of a known microprocessor, such as those described in a data book published 1976 by Advanced Micro Devices, Inc., California, U.S.A., under the title of "The Am2900 Family Data Book", pages 5–16.

It would have been understood that the control unit 20 is not much different from either of that described in the above-cited U.S. Pat. No. 4,059,725 with reference to FIGS. 5, 6, and 8 and that described in the above-referenced U.S. Pat. No. 4,049,913 in connection with FIGS. 1, 2, and 7 and is readily implemented with reference to FIG. 6 of the accompanying drawing. For example, the control unit 20 may comprise a first counter for producing the counter signal q as described already in connection with FIG. 4 of the accompanying drawing, a second counter repeatedly reset upon each count up of the first counter to produce the reference pattern specifying signal $c_1$, a reference pattern duration or time period memory of the type described in U.S. Pat. No. 4,049,913 with reference to FIG. 1 or U.S. Pat. No.

4,059,725 with reference to FIG. 8, and a third counter coupled to the reference pattern duration memory so as to produce the first partial pattern start point specifying signal $p_{11}$. The control unit 20 may further comprise a signal generator for producing a pair of count signals representative of $(maxJ^c+r)$ and $(minJ^c-r)$, a fourth counter, similar to either of the p-counter and the k-counter described in U.S. Pat. No. 4,049,913 with reference to FIGS. 4 and 6 or 10, coupled to the first counter and the signal generator so as to produce the second partial pattern start point specifying signal $p_{12}$, a fifth counter repeatedly reset upon each count up of the fourth counter to produce the word set specifying signal $x_1$ during the durations predetermined by the already known lengths of the reference word units in the respective word sets $f_x$, a first pulse generator for producing the clear pulses CLR upon each count up of the fifth counter, and a second pulse generator for producing the clock pulses CLK in timed relation to production of the respective word units by the format memory 14.

What is claimed is:

1. A system for recognizing an input pattern feature vector time sequence A(0, I) consisting of a certain number I of first through I-th input pattern feature vectors representative of an input word sequence consisting of first through k-th (K being representative of a predetermined integer) input word units selected from first through K-th word sets, respectively, as one of a plurality of reference word sequences, each word set consisting of at least one reference word unit selected from first through N-th (N being representative of a predetermined number) reference word units $B^n$+s (n being representative of each of 1 through N), each reference word sequence consisting of first through K-th reference word units selected from the respective word sets, said system comprising:

input pattern buffer memory means for memorizing at least a preselected plurality of successive input pattern feature vectors at one time;

reference pattern memory means for memorizing said reference word units as a plurality of reference pattern feature vector time sequences, respectively, and for producing said reference word units successively in a predetermined order;

similarity measure calculating means connected to said input pattern buffer memory means and said reference pattern memory means for calculating a plurality of elementary similarity measures S(p, q, n)'s between a plurality of elementary partial patterns A(p, q)'s and the successively produced reference word units, each partial pattern being segmented from said input pattern feature vector time sequence at a pair of smaller-numbered and greater-numbered segmentation points p and q so as to consist of (p+1)-th through q-th input pattern feature vectors;

format memory means for memorizing a format defined by said word sets;

word set specifying means connected to said format memory means for successively specifying said word sets in a prescribed order to make said format memory means produce the reference word units of the specified word sets; and matching means connected to said similarity measure calculating means, said format memory means, and said word set specifying means for carrying out pattern matching between a plurality of specific partial pattern concatenations and said plurality of reference word sequences to decide said one reference word sequence by finding a maximum of sums of individual similarity measures S(p(k−1), p(k), n(k))'s (k being representative of each 1 through K) with each individual similarity measure selected, while a k-th word set is specified, from said plurality of elementary similarity measures with each reference word unit $B^{n(k)}$ selected from said k-th word set and with a k-th specific partial pattern A(p(k−1), p(k)) in each specific partial pattern concatenation selected from said plurality of elementary partial patterns.

2. A system as claimed in claim 1, said word set specifying means specifying said word sets successively from said first word set to said K-th word set, wherein said matching means comprises:

first means for successively specifying greater-numbered segmentation points in an ascending order;

second means coupled to said first means for successively specifying a group of smaller-numbered segmentation points in a preselected order for each greater-numbered segmentation point to define a group of elementary partial patterns A(p, q)'s segmented from said input pattern feature vector time sequence at said group of smaller-numbered segmentation points and said each greater-numbered segmentation point;

similarity measure selecting means connected to said similarity measure calculating means, said first means, said second means, and said format memory means for selecting a group of elementary similarity measures S(p, q, n(k))'s calculated between said group of elementary partial patterns and the reference word units of the specified word set;

partial similarity measure deciding means connected to said similarity measure selecting means, said second means, and said word set specifying means for deciding a k-th partial similarity measure $\tilde{S}$(p, q, k) by finding a maximum of the elementary similarity measures of said group at a particular instant at which a particular smaller-numbered segmentation point is specified during the time that said k-th word set is specified and that a particular greater-numbered segmentation point is specified, thereby to select said k-th specific partial pattern with said (k−1)-th and k-th segmentation points given by said particular smaller-numbered and said particular greater-numbered segmentation points, respectively;

partial recognition result deciding means connected to said partial similarity measure deciding means, said second means, said word set specifying means, and said format memory means for deciding a k-th partial recognition result $\tilde{N}$(p, q, k) representative of that particular reference word unit of said k-th word set which is produced at said particular instant; and second matching means connected to said first means, said partial similarity measure deciding means, and said partial recognition result deciding means for carrying out said pattern matching by finding a maximum of sums of the partial similarity measures decided for the successively specified greater-numbered segmentation points, said maximum partial similarity measure sum giving said maximum individual similarity measure sum, and by selecting those first through K-th optimum reference word units n(k)'s as the respective reference word units of said one reference word sequence from the partial recognition results decided for the successively specified greater-numbered segmentation point for which the maximum partial similarity measure sum is found.

3. A system as claimed in claim 2, wherein:

said partial similarity measure deciding means comprises:

maximum selecting means connected to said similarity measure selecting means for selecting said maximum elementary similarity measure to decide said partial similarity measure; and partial similarity measure buffer memory means connected to said maximum selecting means, said second means, and said word set specifying means and having first addresses accessible by the specified smaller-numbered segmentation points and the specified word sets for memorizing said partial similarity measure in the first address accessed by said particular smaller-numbered segmentation point and said particular word set;

said partial recognition result deciding means comprising:

particular reference word selecting means connected to said maximum selecting means and said format memory means for selecting said particular reference word unit to decide said particular recognition result; and partial recognition result buffer memory means connected to said particular reference word selecting means, said second means, and said word set specifying means and having second addresses accessible by the specified smaller-numbered segmentation points and the specified word sets for memorizing said partial recognition result in the second address accessed by said particular smaller-numbered segmentation point and said particular word set.

4. A system as claimed in claim 3, further comprising means responsive to said I-th input pattern feature vector for producing an end pulse, said format memory means comprising means (K) for specifying said predetermined integer, said second matching means comprising:

third means coupled to said first means for successively specifying, for each greater-numbered segmentation point, integers 1 through K in a preassigned order to specify the respective word sets;

fourth means coupled to said third means for successively specifying, for each integer specified by said third means, serial numbers varying from zero to said each greater-numbered segmentation point less one to specify the smaller-numbered segmentation points for said each greater-numbered segmentation point;

fifth means responsive to the successively specified integers and serial numbers for making the first addresses accessed by said integers and serial number produce first contents of the accessed first address;

sixth means responsive to the successively specified integers and serial numbers for making the second addresses accessed by said integers and serial numbers produce second contents of the accessed second addresses;

maximum partial similarity measure sum finding means connected to said fifth and sixth means for summing up the first contents produced from the first addresses accessed by the integers and serial numbers specified for said each greater-numbered segmentation point with said each greater-numbered segmentation point successively varied up to the I-th segmentation point, finding maxima of the first content sums for particular ones of the successively varied greater-numbered segmentation points, respectively, deciding that particular one of said integers as representative of a particular word set and that particular one of said serial numbers as a provisional segmentation point $P(q, k)$ for said particular greater-numbered segmentation point and for said particular word set for which each first content sum maximum is found, and deciding that particular recognition result as a provisional recognition result $N(q, k)$ for said particular greater-numbered segmentation point and for said particular word set which is produced from the second addresses accessed by said particular integer and said particular serial number, the first content sum maximum found when said I-th segmentation point is specified as said each greater-numbered segmentation point giving said maximum partial similarity measure sum; and decision means connected to said maximum partial similarity measure sum finding means and responsive to said end pulse and the specified predetermined integer for selecting said optimum reference word units from the provisional recognition results for the respective particular greater-numbered segmentation points and for the respective particular word sets by successively deciding optimum segmentation points $\hat{p}(x)$ for the $(K-1)$-th through first optimum reference word units.

* * * * *

UNITED STATES PATENT AND TRADEMARK OFFICE
CERTIFICATE OF CORRECTION

PATENT NO. : 4,286,115
DATED : August 25, 1981
INVENTOR(S) : Hiroaki SAKOE

It is certified that error appears in the above—identified patent and that said Letters Patent is hereby corrected as shown below:

Column 3, line 34, delete "parallel" and insert -- partial -- ;

line 45, delete "S(A)" and insert -- S(A( -- .

Column 4, line 21, in equation, delete "$\hat{S}$" and insert -- S -- ;

line 27, in equation, delete "S" (first occurrence) and insert -- $\hat{S}$ -- ; delete "$\hat{S}$" (second occurrence) and insert -- S -- ;

line 47, delete "ech" and insert -- each -- .

Column 5, lines 7, 8 and 9, delete "$B^n$" and insert -- $\overset{\circ}{B}\vphantom{B}^{\hat{n}}$ -- .

Column 6, line 56, delete "$\{K\}_k$" and insert -- $\{W\}_k$ -- .

Column 7, equation (5), second line, delete "$j=j(i)^{i=1}$" and insert -- $j=j(i) i=1$ -- .

Column 8, line 49, delete "$b_1^y$, $b_1^y$, ..." and insert -- $b_1^y$, $b_2^y$, ... -- ; delete "$b_{jY}^y$" and insert -- $b_{Jy}^y$ -- .

Column 10, line 60, delete "B" and insert -- $\bar{B}$ -- .

Column 11, line 6, delete "p(x)" and insert -- $\hat{p}(x)$ -- ;

line 8, delete "(p(x-1)" and insert -- $(\hat{p}(x-1)$ -- ; delete "p(x))" and insert -- $\hat{p}(x))$ -- ;

line 9, delete "B" and insert -- $\hat{B}$ -- ;

line 11, delete "(p(x-1)" and insert -- $(\hat{p}(x-1)$ -- ; delete "p(x))" and insert -- $\hat{p}(x))$ -- ;

UNITED STATES PATENT AND TRADEMARK OFFICE
CERTIFICATE OF CORRECTION

PATENT NO. : 4,286,115

DATED : August 25, 1981

INVENTOR(S) : Hiroaki SAKOE

It is certified that error appears in the above—identified patent and that said Letters Patent is hereby corrected as shown below:

Column 11, line 48, delete "S(p(x-1,p(x)" and insert --
    S(p(x-1),p(x) -- ;

line 49, delete ")," at the beginning of line.

Column 12, line 23, delete "n(1)" and insert -- $\hat{n}(1)$ -- ;

line 51, delete "T(q, z)" and insert --
    T(q, x) -- ;

line 63, after second comma, delete "x)".

Column 13, line 4, delete "(" before "A" ;

line 20, delete "p" and insert -- $\hat{p}$ -- ;

line 57, before "reference" insert -- like -- .

Column 15, line 34, delete "b's" and insert -- p's -- .

Column 19, line 11, delete "only one finite value" .

UNITED STATES PATENT AND TRADEMARK OFFICE
CERTIFICATE OF CORRECTION

PATENT NO. : 4,286,115

DATED : August 25, 1981

INVENTOR(S) : Hiroaki SAKOE

It is certified that error appears in the above—identified patent and that said Letters Patent is hereby corrected as shown below:

Column 21, line 33, delete "$B^n+s$" and insert -- $B^n$'s -- .

Column 23, line 4, delete "point" and insert -- points -- .

Signed and Sealed this

Seventeenth Day of November 1981

[SEAL]

Attest:

GERALD J. MOSSINGHOFF

Attesting Officer   Commissioner of Patents and Trademarks